United States Patent
Hartzler et al.

(10) Patent No.: US 12,276,325 B1
(45) Date of Patent: Apr. 15, 2025

(54) HYBRID MODULE THRUST BUSHING

(71) Applicant: Schaeffler Technologies AG & Co. KG, Herzogenaurach (DE)

(72) Inventors: Baylor Hartzler, Wooster, OH (US); Noah Riggenbach, Smithville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/388,644

(22) Filed: Nov. 10, 2023

(51) Int. Cl.
*F16H 45/02* (2006.01)
*B60K 6/387* (2007.10)
*B60K 6/48* (2007.10)

(52) U.S. Cl.
CPC ............ *F16H 45/02* (2013.01); *B60K 6/387* (2013.01); *B60K 2006/4825* (2013.01); *F16H 2045/0284* (2013.01)

(58) Field of Classification Search
CPC . B60K 6/26; B60K 6/38; B60K 6/383; B60K 6/387; B60K 6/405; B60K 6/48; B60K 2006/262; B60K 2006/4825
See application file for complete search history.

(56) References Cited

U.S. PATENT DOCUMENTS

| | | | | |
|---|---|---|---|---|
| 6,109,791 | A * | 8/2000 | Metton | F16C 33/60 384/569 |
| 6,357,228 | B1 * | 3/2002 | Botosan | F16D 33/00 60/330 |
| 7,412,913 | B2 * | 8/2008 | Ishikawa | F16H 41/24 74/733.1 |
| 7,926,635 | B2 * | 4/2011 | Kombowski | F16D 25/0638 192/3.3 |
| 8,096,115 | B2 * | 1/2012 | List | F16H 41/24 60/358 |
| 8,888,630 | B2 * | 11/2014 | Makita | F16H 55/30 474/48 |
| 10,486,520 | B2 * | 11/2019 | Moasherziad | B60K 6/38 |
| 11,428,306 | B2 * | 8/2022 | Steinberger | F16H 57/02 |
| 11,680,636 | B2 * | 6/2023 | Carey | B60K 17/10 180/346 |
| 11,852,226 | B2 * | 12/2023 | Ikeda | F16J 15/40 |
| 2016/0258520 | A1 * | 9/2016 | Schrader | F16C 17/107 |
| 2020/0094668 | A1 * | 3/2020 | Podschwadt | B60K 6/405 |
| 2020/0185996 | A1 | 6/2020 | Klett et al. | |
| 2022/0176799 | A1 | 6/2022 | Lechthaler et al. | |

FOREIGN PATENT DOCUMENTS

JP 2007107689 A 4/2007
WO 2018164555 A1 9/2018

* cited by examiner

*Primary Examiner* — James J Taylor, II

(57) ABSTRACT

A hybrid module includes a rotor carrier, a torque converter, and a thrust bushing. The rotor carrier includes an axially extending portion and a radially extending portion extending radially inward from the axially extending portion. The torque converter includes an impeller having an impeller shell fixed to the rotor carrier and an impeller hub fixed to the impeller shell. The impeller hub extends in an axial direction away from the radially extending portion of the rotor carrier to a distal end. The thrust bushing is connected to the impeller hub. The thrust bushing includes an axial portion in contact with the impeller hub and a radial portion extending radially outward from the axial portion. The radial portion is in contact with the distal end.

17 Claims, 2 Drawing Sheets

HYBRID MODULE THRUST BUSHING

TECHNICAL FIELD

The present disclosure relates generally to a hybrid module and, more specifically, to a thrust bushing for a torque converter of a hybrid module.

BACKGROUND

Hybrid modules are generally known. In some arrangements, the hybrid modules may include a torque converter and multiple components, e.g., a drive plate bolted to a housing, a bearing and spring arranged between the torque converter and the housing, etc., configured to axially position the torque converter when the torque converter is not operating. Often, it is a challenge to package and/or fit all the desired components, e.g., an e-motor, crank damper, torque converter, torque converter clutch, K0 clutch, and resolver within the hybrid module architecture due to axial and radial constraints. Due to limited spacing within a hybrid module envelope, it is desirable to have alternative designs and configurations to fit all the necessary components within the hybrid module while still meeting durability and performance requirements.

SUMMARY

Embodiments of the present disclosure provide a hybrid module including a rotor carrier, a torque converter, and a thrust bushing. The rotor carrier includes an axially extending portion and a radially extending portion extending radially inward from the axially extending portion. The torque converter includes an impeller having an impeller shell fixed to the rotor carrier and an impeller hub fixed to the impeller shell. The impeller hub extends in an axial direction away from the radially extending portion of the rotor carrier to a distal end. The thrust bushing is connected to the impeller hub. The thrust bushing includes an axial portion in contact with the impeller hub and a radial portion extending radially outward from the axial portion. The radial portion is in contact with the distal end.

In embodiments, the thrust bushing may be L-shaped. In embodiments, the rotor carrier and the impeller may define a housing of the torque converter. The radial portion may be disposed external to the housing. The hybrid module may further include a lock-up clutch disposed within the housing and arranged axially between the radial portion and the radially extending portion.

In embodiments, the axial portion of the thrust bushing may be configured to receive an axially extending portion of a transmission housing. The axial portion of the thrust bushing may be configured to be in contact with the axially extending portion of the transmission housing. The thrust bushing may be non-rotatably connected to the impeller hub and may be configured to be rotatably connected to the axially extending portion of the transmission housing.

In embodiments, the radial portion may be configured to axially constrain the torque converter in the axial direction. In embodiments, the thrust bushing may be non-rotatably connected to the impeller hub. In embodiments, the torque converter may further include a turbine arranged axially between the impeller and the radial portion of the rotor carrier. The distal end being disposed axially between the radial portion of the thrust bushing and the turbine.

Embodiments of the present disclosure further provide a torque converter for a hybrid module. The torque converter includes a turbine, an impeller in fluid communication with the turbine, and a thrust bushing. The impeller includes an impeller shell and an impeller hub fixed to the impeller shell. The impeller hub extends in an axial direction away from the turbine to a distal end. The thrust bushing is connected to the impeller hub. The thrust bushing includes an axial portion in contact with the impeller hub and a radial portion extending radially outward from the axial portion. The radial portion is in contact with the distal end.

In embodiments, the thrust bushing may be L-shaped. In embodiments, the distal end may be disposed axially between the radial portion and the turbine. In embodiments, the radial portion may be configured to axially constrain the torque converter in the axial direction. In embodiments, the thrust bushing may be non-rotatably connected to the impeller hub.

In embodiments, the axial portion of the thrust bushing may be configured to receive an axially extending portion of a transmission housing. The axial portion of the thrust bushing may be configured to be in contact with the axially extending portion of the transmission housing. The thrust bushing may be non-rotatably connected to the impeller hub and may be configured to be rotatably connected to the axially extending portion of the transmission housing.

In embodiments, the impeller may define, at least partially, a housing of the torque converter. The turbine may be disposed within the housing, and the radial portion may be disposed external to the housing. The torque converter may further include a lock-up clutch disposed within the housing. The turbine may be disposed axially between the radial portion and the lock-up clutch.

Embodiments of the present disclosure provide the advantageous benefit of axially constraining a torque converter, for example, by providing a thrust bushing for axially constraining an impeller hub of the torque converter. Further embodiments disclosed herein offer design advantages by axially constraining the torque converter with a single component, which can reduce costs and complexity of the torque converter while satisfying packaging constraints in hybrid modules and still meeting durability and performance requirements.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
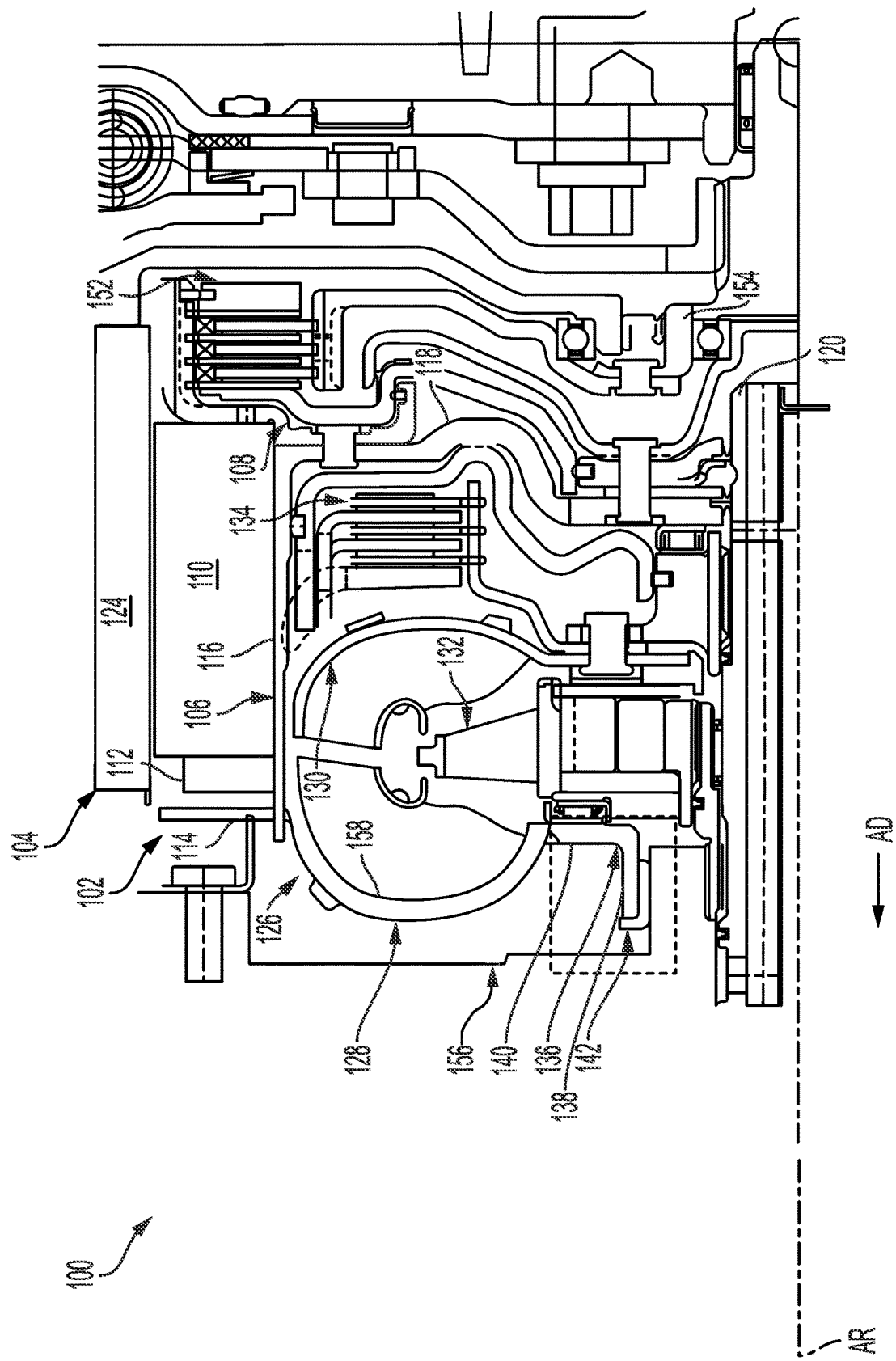
FIG. 1 shows a partial cross-sectional view of a hybrid module according to an exemplary embodiment of the present disclosure.
Figure 2:
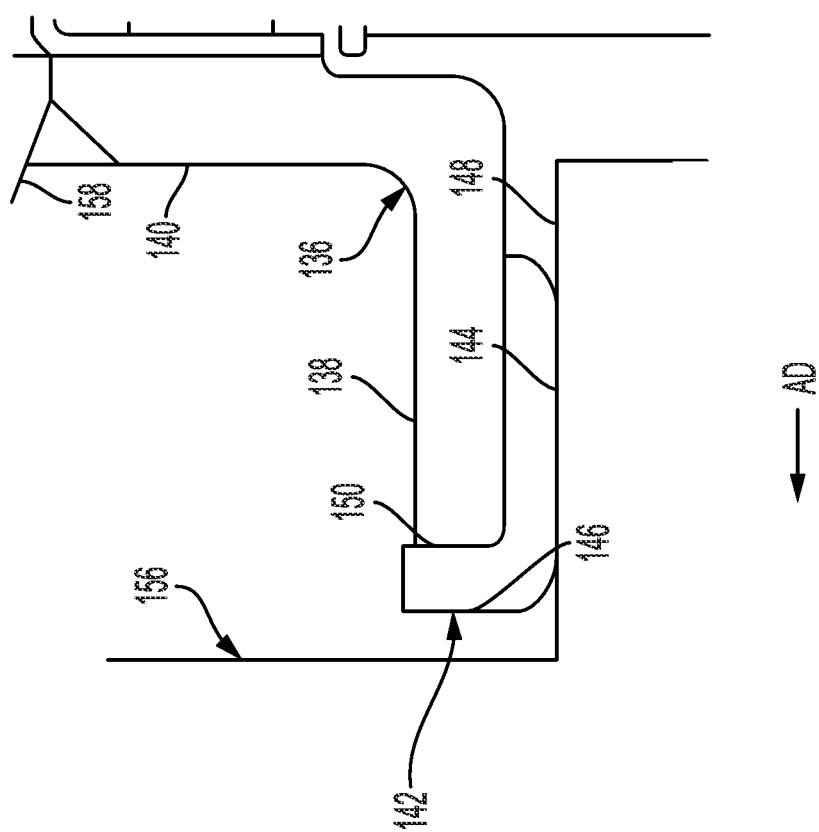
FIG. 2 illustrates an enlarged view of an area of the hybrid module shown in FIG. 1.

Referring to FIGS. 1-2 a portion of a hybrid module 100 is illustrated according to an exemplary embodiment of the present disclosure. At least some portions of the hybrid module 100 are rotatable about an axis of rotation AR. While only a portion of the hybrid module 100 above the axis of rotation AR is shown in FIG. 1, it should be understood that the hybrid module 100 can appear substantially similar below the axis of rotation AR with many components extending about the axis of rotation AR. Words such as "axial," "radial," "circumferential," "outward," etc. as used herein are intended to be with respect to the axis of rotation AR.

The hybrid module 100 includes a rotor assembly 102 and a stator assembly 104 forming an e-motor assembly. The rotor assembly 102 includes a rotor carrier 106, a rotor flange 108, a rotor segment 110, a spring end plate 112, and an end ring 114. The rotor carrier 106 includes an axially extending portion 116 and a radially extending portion 118 extending radially inward from the axially extending portion 116 toward the axis of rotation AR, wherein the radially extending portion 118 is configured to connect with a transmission input shaft 120. The rotor flange 108 is fixed to the radially extending portion 118 of the rotor carrier 106. The rotor flange 108 may include a carrier portion (not numbered) arranged radially outward of the axially extending portion 116 of the rotor carrier and extending away from the rotor assembly 102.

The rotor segment 110 is installed and arranged on a radially outer surface of the axially extending portion 116 of the rotor carrier 106. Additionally, the rotor segment 110 may contact an axial surface of the rotor flange 108. In one embodiment, the rotor segment 110 may be comprised of a stack of segments. The spring end plate 112 is assembled on an axial side of the rotor segment 110 opposite the rotor flange 108. In another embodiment, the hybrid module 100 may include a second spring end plate assembled axially between the rotor segment 110 and the axial surface of the rotor flange 108. The end ring 114 is fixed to the radially outer surface of the axially extending portion 116 of the rotor carrier 106 adjacent to the spring end plate 112. In this way, the spring end plate 112 is disposed axially between the end ring 114 and the rotor segment 110. The end ring 114 is configured to compress the spring end plate 112 to clamp and/or secure the rotor segment 110 to the rotor carrier 106 and the rotor flange 108 for frictional torque transmission therebetween. Once the desired compression force is achieved, the end ring 114 is fixed to the rotor carrier 106, e.g., by welding.

The stator assembly 104 is disposed radially outside of the rotor assembly 102 and is fixed relative to the rotor assembly 102. The stator assembly 104 includes a stator carrier (not shown) and a stator segment 124. In one embodiment, the stator segment 124 may be a stack of stator segments. The stator segment 124 is installed and arranged on an inner surface of the stator carrier. In one embodiment, the stator segment 124 may be installed on the stator carrier via a shrink fit arrangement. That is, the stator carrier is heated to expand the inner surface, the stator segment 124 is installed on the stator carrier, and the inner surface shrink fits to the stator segment 124 after the stator carrier cools.

The hybrid module 100 further includes a torque converter assembly 126 fully disposed radially inside the rotor assembly 102. The torque converter assembly 126 includes: an impeller 128 having an impeller shell 158 with at least one blade attached thereto, a turbine 130 having a turbine shell with at least one blade attached thereto; a stator 132 having at least one blade attached thereto; and a lock-up clutch 134. The impeller shell 158 may be fixed to the rotor carrier 106, e.g., via a welded connection.

The impeller 128 further includes an impeller hub 136 connected to an inner end of the impeller shell 158, e.g., via welding. The impeller hub 136 includes a first portion 138 extending in an axial direction AD away from the turbine 130 to a distal end 150. The first portion 138 may extend substantially parallel to the axis of rotation AR. By "substantially parallel," we mean that a longitudinal axis of the first portion 138 and the axis of rotation AR extend in a common axial direction with the understanding that they may deviate from being parallel with each other due to manufacturing tolerances and capabilities. The impeller hub 136 may include a second portion 140 extending radially inward from the impeller shell 158 to the first portion 138.

The impeller 128 and the rotor carrier 106 together form a housing for the torque converter assembly 126. The lock-up clutch 134, the turbine 130, and the stator 132 are disposed within the housing formed by the impeller 128 and the rotor carrier 106.

The lock-up clutch 134 may be disposed between the turbine 130 and the radially extending portion 118 of the rotor carrier 106. The lock-up clutch 134 may include: a piston (not numbered); a reaction plate (not numbered) fixed to the axially extending portion 116 of rotor carrier 106 and disposed axially between the piston and the turbine 130; a plurality of clutch plates (not numbered) disposed axially between the piston and the reaction plate; and an inner disk carrier (not numbered) disposed axially between the piston and the turbine 130. The plurality of clutch plates may be connected to the inner disk carrier. The piston may be sealed to the rotor carrier 106 at a radially outer end and may be sealed to an output hub (not numbered) at a radially inner end. The inner disk carrier may be connected to the turbine shell and the output hub at a radially inner end, for example, via a riveted connection. The output hub is connected to the transmission input shaft 120 for torque transmission therebetween.

The torque converter assembly 126 further includes a thrust bushing 142. The thrust bushing 142 includes an axial portion 144 extending along the axis of rotation AR and a radial portion 146 extending radially outward, i.e., away from the axis of rotation AR, from an end of the axial portion 144. That is, the thrust bushing 142 has an L-shape in cross-section along the axis of rotation AR. The axial portion 144 may, for example, be non-rotatably connected to the impeller hub 136, e.g., via a press-fit connection. That is, the first portion 138 of the impeller hub 136 may be configured to receive the axial portion 144 of the thrust bushing 142. The axial portion 144 is configured to receive an axially extending portion 148 of a transmission housing 156. That is, the axial portion 144 is arranged radially between the first portion 138 of the impeller hub 136 and the axially extending portion 148 of the transmission housing 156. The axial portion 144 is configured to center, i.e., pilot, the impeller hub 136 relative to the axially extending portion 148. Specifically, the axial portion 144 is in contact with the first portion 138 and the axially extending portion 148. The thrust bushing 142 may, for example, be rotatably connected to the axially extending portion 148 of the transmission housing 156, e.g., via a slip-fit connection.

The radial portion 146 is arranged external to the housing of the torque converter assembly 126. That is, the distal end 150 of the first portion 138 is disposed axially between the radial portion 146 and the turbine 130. The radial portion 146 is in contact with the distal end 150 of the first portion 138. The radial portion 146 is configured to axially constrain the torque converter assembly 126. That is, the radial portion 146 provides axial thrust support for the impeller hub 136. Specifically, the radial portion 146 exerts a force on the distal end 150 of the first portion 138 to assist in positioning the torque converter assembly 126 when the torque converter assembly 126 is not operating. For example, when the torque converter assembly 126 is not operating, the radial portion 146 can axially constrain the torque converter assembly 126, i.e., limit axial movement of the torque converter assembly 126 in the axial direction AD.

The hybrid module 100 may further include a K0 clutch 152. The K0 clutch 152 may be disposed on an axial side of the radially extending portion 118 opposite the lock-up clutch 134. That is, the radially extending portion 118 may be disposed axially between the lock-up clutch 134 and the K0 clutch 152. Said differently, the K0 clutch may be disposed external to the housing of the torque converter assembly 126. The K0 clutch 152 is arranged to drivingly connect the rotor assembly 102 to a K0 shaft 154. In other words, the K0 clutch 152 selectively connects and disconnects the rotor assembly 102 and the K0 shaft 154. The K0 shaft 154 is arranged for driving connection with a crankshaft (not numbered) of an internal combustion engine (not shown). In other words, the K0 shaft 154 is arranged to receive torque from the engine and/or transmit torque to the engine when installed and operated in a vehicle powered at least in part by the engine.

Providing the thrust bushing 142 allows for axially supporting the impeller hub 136, which can axially constrain the torque converter assembly 126 when the torque converter assembly 126 is not operating. Further, embodiments disclosed herein allows for positioning the torque converter assembly 126 when the torque converter assembly 126 is not operating without requiring multiple components, which can reduce costs and complexity of the hybrid module and can assist in packaging the hybrid module 100 in smaller envelopes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
108 rotor flange
110 rotor segment
112 spring end plate
114 end ring
116 axially extending portion
118 radially extending portion
120 transmission input shaft
124 stator segment
126 torque converter assembly
128 impeller
130 turbine
132 stator
134 lock-up clutch
136 impeller hub
138 first portion
140 second portion
142 thrust bushing
144 axial portion
146 radial portion
148 axially extending portion
150 distal end
152 K0 clutch
154 K0 shaft
156 transmission housing
158 impeller shell
AR axis of rotation
AD axial direction

What is claimed is:

1. A hybrid module, comprising:
   a rotor carrier including an axially extending portion and a radially extending portion extending radially inward from the axially extending portion;
   a torque converter including an impeller having an impeller shell fixed to the rotor carrier and an impeller hub fixed to the impeller shell, the impeller hub extending in an axial direction away from the radially extending portion of the rotor carrier to a distal end; and
   a thrust bushing connected to the impeller hub, the thrust bushing including an axial portion in contact with the impeller hub and a radial portion extending radially outward from the axial portion, wherein:
   the radial portion is in contact with the distal end;
   the axial portion of the thrust bushing is configured to receive an axially extending portion of a transmission housing; and the thrust bushing is non-rotatably connected to the impeller hub and is configured to be rotatably connected to the axially extending portion of the transmission housing.

2. The hybrid module according to claim 1, wherein the thrust bushing is L-shaped.

3. The hybrid module according to claim 1, wherein the rotor carrier and the impeller define a housing of the torque converter, the radial portion being disposed external to the housing.

4. The hybrid module according to claim 3, further comprising a lock-up clutch disposed within the housing and arranged axially between the radial portion and the radially extending portion of the rotor carrier.

5. The hybrid module according to claim 1, wherein the axial portion of the thrust bushing is configured to be in contact with the axially extending portion of the transmission housing.

6. The hybrid module according to claim 1, wherein the radial portion is configured to axially constrain the torque converter in the axial direction.

7. The hybrid module according to claim 1, wherein the torque converter further includes a turbine arranged axially between the impeller and the radially extending portion of the rotor carrier, the distal end being disposed axially between the radial portion of the thrust bushing and the turbine.

8. A torque converter for a hybrid module, comprising:
a turbine;
an impeller in fluid communication with the turbine, the impeller including:
an impeller shell; and
an impeller hub fixed to the impeller shell, the impeller hub extending in an axial direction away from the turbine to a distal end; and
a thrust bushing connected to the impeller hub, the thrust bushing including an axial portion in contact with the impeller hub and a radial portion extending radially outward from the axial portion, wherein the radial portion is in contact with the distal end.

9. The torque converter according to claim 8, wherein the thrust bushing is L-shaped.

10. The torque converter according to claim 8, wherein the distal end is disposed axially between the radial portion and the turbine.

11. The torque converter according to claim 8, wherein the axial portion of the thrust bushing is configured to receive an axially extending portion of a transmission housing.

12. The torque converter according to claim 11, wherein the axial portion of the thrust bushing is configured to be in contact with the axially extending portion of the transmission housing.

13. The torque converter according to claim 11, wherein the thrust bushing is non-rotatably connected to the impeller hub and is configured to be rotatably connected to the axially extending portion of the transmission housing.

14. The torque converter according to claim 8, wherein the radial portion is configured to axially constrain the torque converter in the axial direction.

15. The torque converter according to claim 8, wherein the thrust bushing is non-rotatably connected to the impeller hub.

16. The torque converter according to claim 8, wherein the impeller defines, at least partially, a housing of the torque converter, the turbine being disposed within the housing, and the radial portion being disposed external to the housing.

17. The torque converter according to claim 16, further comprising a lock-up clutch disposed within the housing, the turbine being disposed axially between the radial portion and the lock-up clutch.

* * * * *